US009661510B2

(12) United States Patent
Johansson et al.

(10) Patent No.: US 9,661,510 B2
(45) Date of Patent: *May 23, 2017

(54) FAILURE EVENT REPORT EXTENSION FOR INTER-RAT RADIO LINK FAILURE

(71) Applicant: MEDIATEK, INC., Hsin-Chu (TW)

(72) Inventors: Per Johan Mikael Johansson, Kungsangen (SE); Shiang-Jiun Lin, Hsinchu (TW); Yih-Shen Chen, Hsinchu (TW); William Plumb, Charlestown, MA (US)

(73) Assignee: MEDIATEK INC. (TW)

( * ) Notice: Subject to any disclaimer, the term of this patent is extended or adjusted under 35 U.S.C. 154(b) by 287 days.

This patent is subject to a terminal disclaimer.

(21) Appl. No.: 13/688,124

(22) Filed: Nov. 28, 2012

(65) Prior Publication Data
US 2013/0260745 A1 Oct. 3, 2013

Related U.S. Application Data

(63) Continuation-in-part of application No. 13/435,234, filed on Mar. 30, 2012.

(51) Int. Cl.
H04Q 7/20 (2006.01)
H04W 24/02 (2009.01)
(Continued)

(52) U.S. Cl.
CPC ......... *H04W 24/02* (2013.01); *H04L 41/0631* (2013.01); *H04W 76/028* (2013.01);
(Continued)

(58) Field of Classification Search
USPC ......... 370/216, 221–225, 328–332; 455/436, 455/507, 525
See application file for complete search history.

(56) References Cited

U.S. PATENT DOCUMENTS 5,864,679 A 1/1999 Kanai et al. .................. 709/238
8,615,241 B2 12/2013 Gupta et al. .................. 455/437
(Continued)

FOREIGN PATENT DOCUMENTS

CN 101128057 A 2/2008
CN 101212775 A 7/2008
(Continued)

OTHER PUBLICATIONS

International Search Report and Written Opinion of International Search Authority for PCT/CN2012/073386 of related U.S. Appl. No. 13/435,234, dated Jul. 5, 2012 (10 pages).
(Continued)

*Primary Examiner* — Edan Orgad
*Assistant Examiner* — Sithu Ko
(74) *Attorney, Agent, or Firm* — Imperium Patent Works; Zheng Jin

(57) ABSTRACT

A method of inter-RAT failure event report is proposed. A UE detects a failure event in a first cell served by a first base station, and the first cell belongs to a first RAT. The failure event may include a radio link failure or a handover failure. The UE then performs an RRC establishment procedure with a second cell served by a second base station, and the second cell belongs to a second RAT. After the RRC establishment, the UE transmits a failure event report to the wireless network. The failure event can be a radio link failure, or be associated with a mobility command such as a handover command. By providing more reliable information in the failure event report than a network solution could provide, inter-RAT mobility performance can be improved.

18 Claims, 12 Drawing Sheets

(51) Int. Cl.
*H04W 76/02* (2009.01)
*H04L 12/24* (2006.01)
*H04W 36/00* (2009.01)
*H04W 24/04* (2009.01)

(52) U.S. Cl.
CPC ......... *H04L 41/0686* (2013.01); *H04W 24/04* (2013.01); *H04W 36/00* (2013.01)

(56) References Cited

U.S. PATENT DOCUMENTS

| | | | |
|---|---|---|---|
| 2006/0246888 A1 | 11/2006 | Bender et al. | 455/423 |
| 2007/0054684 A1* | 3/2007 | Ferzali et al. | 455/515 |
| 2008/0102834 A1* | 5/2008 | Bernhard et al. | 455/436 |
| 2008/0160989 A1* | 7/2008 | Favre et al. | 455/424 |
| 2008/0268833 A1* | 10/2008 | Huang et al. | 455/425 |
| 2009/0046578 A1* | 2/2009 | Aydin et al. | 370/221 |
| 2009/0163211 A1 | 6/2009 | Kitazoe et al. | 455/436 |
| 2009/0196168 A1* | 8/2009 | Aydin et al. | 370/216 |
| 2009/0257353 A1* | 10/2009 | Song et al. | 370/241 |
| 2009/0285157 A1* | 11/2009 | Yeoum et al. | 370/328 |
| 2010/0113033 A1 | 5/2010 | Qiu et al. | 455/438 |
| 2010/0173626 A1 | 7/2010 | Catovic et al. | 455/423 |
| 2010/0173633 A1* | 7/2010 | Catovic et al. | 455/436 |
| 2010/0202413 A1* | 8/2010 | Vikberg et al. | 370/332 |
| 2010/0254348 A1* | 10/2010 | Prakash et al. | 370/331 |
| 2010/0257364 A1* | 10/2010 | Baek et al. | 713/170 |
| 2010/0267365 A1* | 10/2010 | Wang et al. | 455/411 |
| 2010/0278131 A1 | 11/2010 | Jeong | 370/329 |
| 2011/0013597 A1* | 1/2011 | Hwang et al. | 370/331 |
| 2011/0019532 A1 | 1/2011 | Jung et al. | 370/216 |
| 2011/0032816 A1* | 2/2011 | Isaksson et al. | 370/225 |
| 2011/0077008 A1* | 3/2011 | Lu et al. | 455/436 |
| 2011/0077010 A1* | 3/2011 | Xu et al. | 455/437 |
| 2011/0117908 A1* | 5/2011 | Huang et al. | 455/423 |
| 2011/0164589 A1* | 7/2011 | Lee et al. | 370/331 |
| 2011/0201279 A1 | 8/2011 | Suzuki et al. | 455/67.11 |
| 2011/0218003 A1* | 9/2011 | Qiu | 455/507 |
| 2011/0250925 A1 | 10/2011 | Han | 455/524 |
| 2011/0300896 A1* | 12/2011 | Wang | H04W 76/027 455/524 |
| 2012/0069732 A1* | 3/2012 | Xu et al. | 370/221 |
| 2012/0094670 A1* | 4/2012 | Dimou et al. | 455/436 |
| 2012/0147830 A1 | 6/2012 | Löhr et al. | 370/329 |
| 2012/0202557 A1* | 8/2012 | Olofsson | H04W 24/08 455/525 |
| 2013/0189991 A1* | 7/2013 | Rose | H04W 16/18 455/436 |
| 2013/0194948 A1* | 8/2013 | Mallik et al. | 370/252 |
| 2014/0050197 A1* | 2/2014 | Legg | H04W 76/028 370/331 |
| 2014/0087729 A1* | 3/2014 | Olofsson et al. | 455/436 |
| 2015/0131454 A1* | 5/2015 | Wegmann | H04L 41/069 370/242 |

FOREIGN PATENT DOCUMENTS

| | | |
|---|---|---|
| CN | 101815314 A | 2/2009 |
| CN | 101505508 A | 8/2009 |
| CN | 101541052 A | 9/2009 |
| CN | 101731016 A | 6/2010 |
| CN | 101959262 A | 1/2011 |
| CN | 102027798 A | 4/2011 |
| CN | 102595441 A | 7/2012 |
| EP | 2086253 A1 | 8/2009 |
| JP | 2012514398 | 6/2012 |
| WO | WO2009052686 | 4/2009 |
| WO | WO 2009052686 A1 * | 4/2009 |
| WO | WO2011006376 A1 | 1/2011 |
| WO | WO2012047921 A1 | 4/2012 |

OTHER PUBLICATIONS

EPO, Office Action for EP patent application 12765195.8 dated May 15, 2014 (14 pages).
JPO, Office Action for JP patent application 2013-553780 dated Jun. 17, 2014 (3 pages).
3GPP TSG-RAN WG3 #70 R3-103243, CATT, Handling of RLF Indication Duplication, Jacksonville, US, Nov. 15-19, 2010 (4 pages).
3GPP TSG-RAN WG3#69bis R3-103038, Samsung, Way Forward for RLF Reporting in Rel-10, Xi'an, China, Oct. 11-15, 2010 (5 pages).
3GPP TSG RAN WG2 Meeting #73 R2-111238, Huawei, Extended RLF Report, Taipei, Taiwan, Feb. 21-25, 2011 (4 pages).
3GPP TSG RAN WG3 Meeting 69bis R3-103097, Huawei, Handling of Multiple RLF Indications, Xi'an, China, Oct. 11-15, 2010 (3 pages).
USPTO, Office Action for related U.S. Appl. No. 13/781,395 dated Mar. 9, 2015 (12 pages).
USPTO, Office Action for related U.S. Appl. No. 13/435,234 dated Mar. 20, 2015 (13 pages).
USPTO, Office Action for related U.S. Appl. No. 13/435,234 dated Feb. 19, 2016 (13 pages).
SIPO, Office Action for the CN patent application 201310220541.0 (no English translation is available) dated Aug. 15, 2016 (8 pages).
SIPO, Office Action for the CN patent application 201310221156.8 (no English translation is available) dated Aug. 17, 2016 (7 pages).
USPTO, Office Action for related U.S. Appl. No. 13/435,234 dated Sep. 7, 2016 (15 pages).

* cited by examiner

INTER-RAT HOF REPORTING – too early HO

INTER-RAT HOF REPORTING – too late HO

INTER-RAT RLF REPORTING TO SOURCE NETWORK

INTER-RAT HOF/RLF REPORTING

FAILURE EVENT REPORT EXTENSION FOR INTER-RAT RADIO LINK FAILURE

CROSS REFERENCE TO RELATED APPLICATIONS

This application is a continuation-in-part of, and claims priority under 35 U.S.C. §120 from nonprovisional U.S. patent application Ser. No. 13/435,234, entitled "Failure Event Report Correlation for Distributed RAN Self-Organization," filed on Mar. 30, 2012, the subject matter of which is incorporated herein by reference. Application Ser. No. 13/435,234, in turn, claims priority under 35 U.S.C. §119 from U.S. Provisional Application No. 61/470,042, entitled "Failure Event Report Correlation for Distributed RAN Self-Organization," filed on Mar. 31, 2011, the subject matter of which is incorporated herein by reference.

TECHNICAL FIELD

The disclosed embodiments relate generally to failure event reporting, and, more particularly, to failure event report extensions for inter-RAT radio link failure.

BACKGROUND

Self-organization is the process where a structure or pattern appears in a system without a central authority or external element imposing it through planning. The vision of self-organization networks (SON), which is in line with the views of 3GPP ($3^{rd}$ Generation Partnership Project), is that future radio access network needs to be easier to plan, configure, manage, optimize, and heal compared to how it used to be. SON has been codified by the 3GPP Release 8 specifications in a series of standards. Newly added base stations should be self-configured in line with a 'plug-and-play' paradigm, while all operational base stations will regularly self-optimize parameters and algorithms behavior in response to observed network performance and radio conditions. Furthermore, self-healing mechanism can be triggered to temporarily compensate for a detected equipment outage, while awaiting a more permanent solution.

In 3GPP networks, Mobility Optimization including MRO (Mobility Robustness Optimization) is a reactive self-optimization function executing in eNodeB that is assumed to optimize handover (HO) parameters. For example, eNodeB needs to optimize UE measurement configuration and HO algorithm behavior to find acceptable or as low as possible HO problem rate, as well as to find a balanced ping-pong rate or HO rate. In a too late HO problem, a connection failure occurs in the source cell before the handover was initiated or during a handover. The UE attempts to re-establish the radio link connection in the target cell (if handover was initiated) or in a cell that is not the source cell (if handover was not initiated). In a too early HO problem, a connection failure occurs shortly after a successful handover from a source cell to a target cell or during a handover. The UE attempts to re-establish the radio link connection in the source cell. In a wrong cell HO problem, a connection failure occurs shortly after a successful handover from a source cell to a target cell or during a handover. The UE attempts to re-establish the radio link connection in a cell other than the source cell and the target cell.

After a failure, e.g., a radio link failure (RLF) or handover failure (HOF), if UE can find another suitable cell of the same RAT, then UE will attempt radio resource control (RRC) re-establishment. According to existing Rel-9 procedures, after a successful re-establishment attempt, the network can use X2 RLF indication procedure to notify the eNB of the previous UE serving cell, and this eNB may do accounting based on this indication for mobility optimization. In Rel-10, the UE may do RLF report also after RRC establishment, e.g., after RRC re-establishment fails, possibly due to non-preparation, and when the subsequent NAS recovery succeeds.

However, there is no way for the network to correlate the subsequent RLF report with the UE context in the previous serving cell. Thus, if 3GPP goes ahead as proposed, then undoubtedly there will be double bookkeeping. First, statistics will be updated based on RRC re-establishment attempts (where RRC re-establishment fails), and statistics will again be updated based on UE RLF report. The Rel-9 and the suggested Rel-10 methods are not fully compatible with each other. Such double bookkeeping will make failure statistics unreliable, and may cause incorrect MRO actions.

Together with the contents in the RLF report, the network known information about the UE at the time of failure is essential in determining what should be the corrective actions for certain failures. For some failures, the most suitable corrective actions may be non-MRO actions, such as reconfiguration of interference coordination scheme or changes to power control etc. Because the UE context in the previous serving cell (e.g., its Cell Radio Network Temporary ID (C-RNTI)) is already known to the network, a solution is sought to always be able to correlate the network-known information with the RLF report to avoid double bookkeeping and to improve MRO decision for SON.

Another potential problem is that RLF reports may be delivered to a base-station very late, e.g. a day after the failure happened. Normally a base-station will not keep the UE context and keep the CRNTI of a UE non-reserved for a very long time, and normally a base-station has limited memory for such storage.

SUMMARY

A method of failure event report correlation is proposed. The method supports correlation of network known information and a failure event report in cases when UE establishes a fresh RRC connection, e.g. after Idle mode or after being connected in another Radio Access Technology, and also takes into account that base stations have limited storage for old UE contexts.

A UE detects a failure event in a first cell served by a first base station, and the UE is assigned with a previous C-RNTI. The failure event may include a radio link failure, a handover failure, or a RACH failure. If the UE goes to Idle, e.g. due to a failed RRC re-establishment or the UE goes to another RAT and comes back, the UE then performs an RRC establishment procedure with a second base station, and the UE is assigned with a new C-RNTI. In some cases, the second and the first base stations could be the same. After the RRC establishment, the UE transmits a failure event report along with the correlation information to the second base station. The second base station then forwards the failure event report and the previous C-RNTI or other correlation information to the first base station. The first base station can correlate the failure event report with the previous failure event indication and with UE information stored in the base-station based on the previous C-RNTI or other correlation information to avoid double bookkeeping and improve MRO decision for SON.

In a first embodiment, the UE receives the correlation information from the second base station during an RRC re-establishment procedure, where the UE provides its previous C-RNTI. The correlation information can uniquely identify the UE. For example, the correlation information is contained in a new information element (IE) provided by the second base station in an RRC re-establishment reject message. The UE just echoes the correlation information back to the second base station later on, along with the failure event report. This is a very low overhead and simple method.

In a second embodiment, which is one specific example of the first embodiment, the UE receives and deduces the correlation information from a random access channel (RACH) procedure with the second base station during the RRC re-establishment procedure. The correlation information is based on the RACH resource used for the RRC re-establishment procedure. For example, the correlation information may include the RACH preamble and timing information such as the system frame number (SFN) used for the RACH transmission that was successful.

In another specific example, the UE receives the correlation information from the first base station during the ongoing RRC connection. The correlation information can uniquely identify the UE or identify a class of UEs. The class of UEs would typically be a group of UEs with similar handover and handover measurement parameter settings or parameters that affect how Handover signaling messages are transmitted. For example, the correlation information is contained in a new information element (IE) provided by the first base station in an RRC message. The UE just echoes the correlation information back to the second base station later on, along with the failure event report. This is a very low overhead and simple method.

In a third embodiment, the UE does not receive the correlation information from the base station during the RRC re-establishment procedure. When the UE transmits the failure event report, the UE also transmits an indication of the existence of the previous RRC re-establishment attempt to the second base station. For example, the indication may be a Boolean variable of {RRC REEST ATTEMPT=TRUE}. When the first base station receives such indication forwarded by the second base station, it may still be able to correlate the failure event report with the previous failure event.

In a fourth embodiment, the UE only provides the correlation information if it is fresh. In one example, the UE determines the freshness of the correlation information based on a timer, i.e., the time elapsed from the failure event to the failure event reporting should not exceed a certain threshold. In another example, the UE determines the freshness of the correlation information based on the knowledge that the UE has not dwelled on another RAT. If the correlation information is not fresh and no longer useful, then it is discarded by the UE. Instead, the UE may indicate the earlier RRC re-establishment attempt via a Boolean variable along with the failure event report.

A method of inter-RAT failure event report is also proposed. A UE detects a failure event in a first cell served by a first base station, and the first cell belongs to a first RAT. The failure event may include a radio link failure or a handover failure. The UE then performs an RRC establishment procedure with a second cell served by a second base station, and the second cell belongs to a second RAT. After the RRC establishment, the UE transmits a failure event report to the wireless network. In one embodiment, the failure event report comprises an identity, a carrier frequency and a radio access technology of the cell where RRC establishment is performed, and the information is reported to the first RAT. In another embodiment, the failure event report comprises an identity, a carrier frequency and a radio access technology of the cell wherein the failure event was triggered, and the information is reported to the second RAT.

The failure event can be associated with a mobility command including a handover command, a redirection, an NACC, a CSFB, and enhanced CSFB, or an SRVCC, for the UE to move to a target cell of another RAT. In one embodiment, the mobility command is a handover command, and the recorded information comprises whether the handover command is blind. In another embodiment, the recorded information comprises a type of failure to be one of the target cell not found, the target not suitable/not allowed, or access failed in the target cell.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
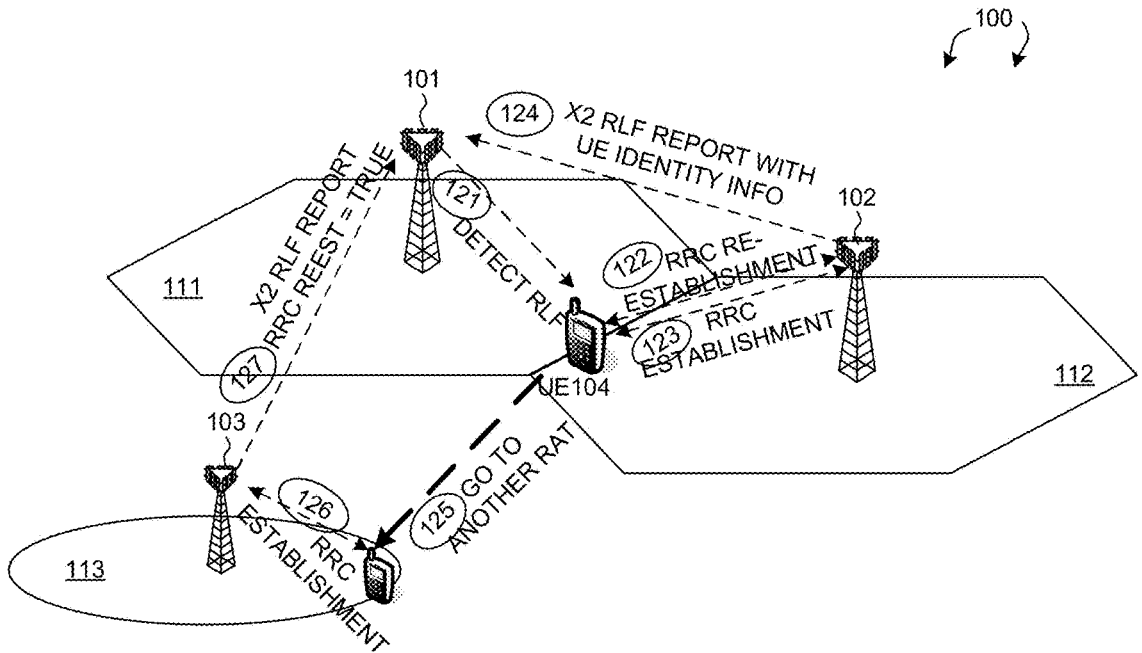
FIG. 1 illustrates a wireless communication network with failure event report correlation in accordance with one novel aspect.

FIG. 1 illustrates a wireless communication network 100 with failure event report and correlation in accordance with one novel aspect. Wireless communication network 100 comprises a plurality of base stations (eNB 101, eNB 102, and eNB 103) and a user equipment UE 104. UE 104 is originally served by eNB 101 in cell 111 and is in RRC_CONNECTED state. Later, UE 104 detects a radio link failure (RLF), and records radio signal measurement information before the RLF for later reporting (step 121). After detecting the failure event, UE 104 stays in RCC_CONNECTED mode and performs cell selection. Once a suitable cell is found, UE 104 attempts RRC re-establishment. For example, UE 104 selects cell 112 and performs RRC re-establishment with eNB 102 (step 122). The RRC re-establishment procedure is a quick and mostly-RAN-local procedure, and may work only if cell 112 is prepared, e.g., only if eNB 102 already has the UE context information. For example, the RRC re-establishment procedure will succeed if UE 104 tries to re-setup the connection to the same eNB 101 where UE 104 was earlier connected, or if eNB 102 has been previously prepared by eNB 101 where UE 104 was previously connected (e.g., at handover or re-establishment preparation). In many other cases, however, there is little chance that the target cell has the UE context information. The RRC re-establishment message from the UE includes UE identification information such as the Cell Radio Network Temporary ID (C-RNTI) of the UE and the cell ID of the cell where the UE was previously connected.

During the RRC re-establishment, eNB 102 forwards an RLF indication along with UE identification information to the previous serving eNB 101 via X2 interface. If the RRC re-establishment fails, then UE 104 changes its state from RRC_CONNECTED to RRC_IDLE and may perform cell selection procedure. Once a suitable cell is found, UE 104 attempts RRC establishment. Usually, the same cell is selected as the one where the UE attempted RRC re-establishment. In one embodiment, eNB 102 sends certain correlation information {X} to UE 104 if the RRC re-establishment fails. The correlation information {X} is any information that can identify the UE as the UE that failed the RRC re-establishment.

In one embodiment of FIG. 1, UE 104 selects cell 112 and performs RRC establishment with eNB 102 (step 123). As compared to the RRC re-establishment procedure, the RRC establishment procedure involves the core network to greater extent, takes slightly longer time, but assumes no prior knowledge of the UE in the RAN. RAN does not know whether the UE was previously connected because no such information is provided to the RAN. In fact, RAN has no ability to identify the UE and the UE is given a new C-RNTI. This also applies to the case when the RRC re-establishment has just failed and NAS-recovery triggers the RRC connection setup.

During the RRC establishment procedure, UE 104 indicates to eNB 102 that there is an RLF report available. Upon receiving an information request from eNB 102, UE 104 sends the RLF report along with the correlation information {X} to eNB 102. In one embodiment, based on the correlation information {X}, eNB 102 is able to determine the previous UE identity. In step 124, eNB 102 forwards the received RLF report, together with the previous UE identity, to the previous serving eNB 101 via X2 interface. This information enables eNB 101 to identify the UE in connection with the earlier RLF failure event, which was already indicated by eNB 102 to eNB 101 during the RRC re-establishment via X2 interface. Based on the provided information, eNB 101 can correlate the X2 RLF report with the earlier X2 RLF indication, and with previous UE context information that eNB 101 has stored.

In another embodiment of FIG. 1, UE 104 goes to another radio access technology (RAT) (step 125). UE 104 may stay there for significant amount of time before attempting RRC establishment with eNB 103 (step 126). While UE 104 keeps the RLF information for later reporting, it discards any correlation information {X} because such information is no longer fresh and useful, because it is assumed that eNB 101 has discarded the stored UE context at this time. As a result, in step 127, eNB 103 simply forwards the RLF report to eNB 101 without UE identity information. Instead, UE 104 may indicate to eNB 103 that a previous RCC re-establishment procedure has failed, and eNB 103 forwards such indication to eNB 101 along with the RLF report. Based on such indication, eNB 101 may still be able to correlate the X2 RLF report with the earlier X2 RLF indication, or at least avoid double bookkeeping for the failure event.

RRC re-establishment is an optimized procedure built on the assumption that UE identifies itself in such a way that the UE context of the UE can be identified. On the other hand, RRC establishment, e.g., mobility with redirection, RAN does not know if/where UE was previously connected. Therefore, the strong benefit in providing a solution based on correlation is that: a) it is both backwards compatible with other solutions based on X2 RLF indication message and it is future proof; and b) it enables the combination of network knowledge and information reported by the UE in the failure event report, to make good quality conclusions, and to reduce requirement of the contents of the UE failure event report because information already known in the network does not need to be reported by the UE. The failure event is either radio link failure, handover failure, or RACH failure. Scenario would apply to all the cases because they may all be caused by mobility problems, and they may generate first a RRC re-establishment, then if failed a following RRC establishment triggered by NAS.

Figure 2:
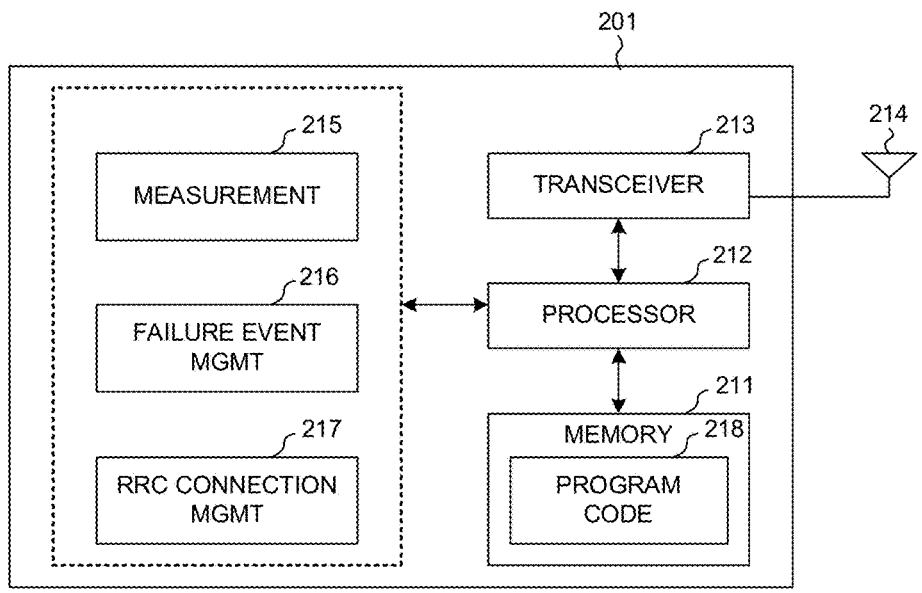
FIG. 2 is a simplified block diagram of a user equipment in accordance with one novel aspect.

FIG. 2 is a simplified block diagram of a user equipment UE 201 in accordance with one novel aspect. UE 201 comprises memory 211, a processor 212, a transceiver 213 coupled to an antenna 214. UE 201 also comprise various modules including a measurement module 215 that performs radio signal measurements, a failure event management module 216 that detects failure events and manages failure event reporting, and an RRC connection management module 217 that performs cell (re)selection and RRC (re)establishment procedures. The different modules are function modules that can be implemented by software, firmware, hardware, or any combination thereof. The function modules, when executed by the processor 212 (e.g., via executing program code 218), allow UE 201 to perform various functions accordingly. A base station may comprise similar structure including various function modules to support related functionalities.

Figure 3:
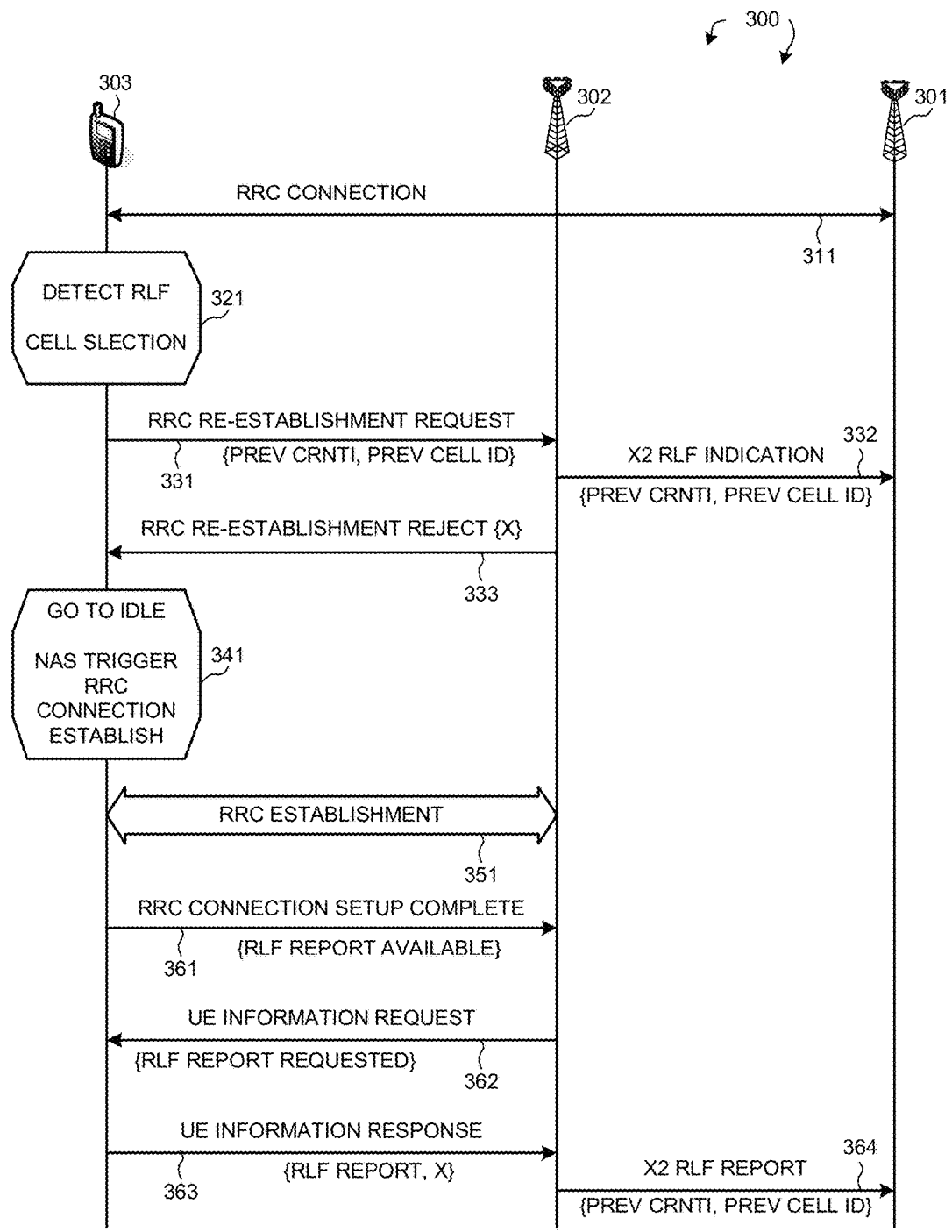
FIG. 3 illustrates a first embodiment of reporting failure event with correlation information.

FIG. 3 illustrates a first embodiment of reporting failure event with correlation information in a wireless communication network 300. Wireless communication network 300 comprises a first eNB 301, a second eNB 302, and a UE 303. Initially, UE 303 is in RRC_CONNECTED mode, and communicates with its serving eNB 301 in a serving cell over an established RRC connection (step 311). With the RRC connection, eNB 301 stores UE context information, which is associated with the identity of UE 303 with respect to the RRC connection. For example, the UE identity information may include the C-RNTI, the cell ID, and the message authentication code (MAC-I) for the RRC connection. Later, UE 303 detects a failure event such as an RLF in step 321. UE 303 records radio signal measurement information related to the RLF failure event for future reporting. The RLF report may include radio signal measurements (e.g., RSRP/RSRQ measurements) before the time of the RLF. UE 303 stays in RRC_CONNECTED mode and performs cell selection.

In step 331, UE 303 starts to perform RRC re-establishment with eNB 302 and sends an RRC re-establishment request to eNB 302. The RRC re-establishment request contains the UE identity information with respect to the earlier RRC connection, such as the previous C-RNTI, the previous cell ID, and the previous MAC-I. Upon receiving the RRC re-establishment request, eNB 302 forwards an RLF indication to eNB 301 via X2 interface. The RLF indication contains the earlier UE identity so that eNB 301 can identify the corresponding UE. The RLF indication, however, does not contain the actual RLF report because no secure RRC connection has been established between UE 303 and eNB 302.

In the example of FIG. 3, the RRC re-establishment procedure fails because eNB 302 has not been prepared before the re-establishment attempt. In step 333, eNB 302 sends an RRC re-establishment reject message to UE 303. In one novel aspect, the RRC re-establishment reject message also contains correlation information {X}, which may be contained in a new information element (IE). The correlation information {X} is any information that can be used by eNB 302 later to identify UE 303. Upon receiving the RRC re-establishment reject message, UE 303 goes to RRC_IDLE mode in step 341. NAS triggers RRC connection establishment immediately thereafter. Typically, if UE 303 does not quickly go away, then eNB 302 is still the target base station for UE 303.

In step 351, UE 303 performs RRC establishment procedure with eNB 302. The RRC establishment procedure is a heavy-weight procedure, during which the UE and the eNB performs various levels of downlink (DL) and uplink (DL) synchronization, negotiation and configuration, and finally establish a new RRC connection. RAN/eNB 302 does not know whether UE 303 was previously connected and failed because no such information is provided to the RAN/eNB 302. UE 303 is also assigned with a new C-RNTI. Upon the completion of the connection setup, in step 361, UE 303 sends an RRC connection setup complete message to eNB 302. This message also indicates to eNB 302 that UE 303 has an RLF report available. In step 362, eNB 302 sends a UE information request message to UE 303. The request message requests UE 303 to send the available RLF report. In step 363, UE 303 sends an information response message back to eNB 302. The response message contains the RLF report, along with the correlation information {X}.

Once eNB 302 received the RLF report and the correlation information {X}, eNB 302 can identify UE 303 based on the correlation information. More specifically, eNB 302 sends the correlation information {X} to UE 303 in the RRC re-establishment reject message (step 333), and now UE 303 simply echoes back the same correlation information {X} (step 363). The correlation information {X} is uniquely associated with the previous UE identity information, which is received in the RRC re-establishment request message in step 331. As a result, eNB 302 can identify UE 303 and obtain the previous UE identity information. In step 364, eNB 302 forwards the received RLF report to the previous serving eNB 301. In addition, eNB 302 also sends the previous UE identity information (e.g., previous C-RNTI, previous cell ID, and MAC-I) of UE 303 to eNB 301 via X2 interface.

Based on the UE identity, eNB 301 is able to correlate the received RLF report with the earlier RLF indication received in step 332 for the same UE 303, and with previous UE context stored in eNB 301, to avoid double bookkeeping. In addition, eNB 301 is able to make better MRO decision based on measurements contained in the RLF report. By using correlation, UE 303 is not burdened to keep track of and log the identity information or to add the UE identity information into the RLF report, because such information is already known in the network. Normally it is desirable to keep the UEs as simple as possible, and put as much complexity as possible in the network. The correlation information {X} is any information that can be used to identify a UE, or can be part of the UE identity information itself.

Figure 4:
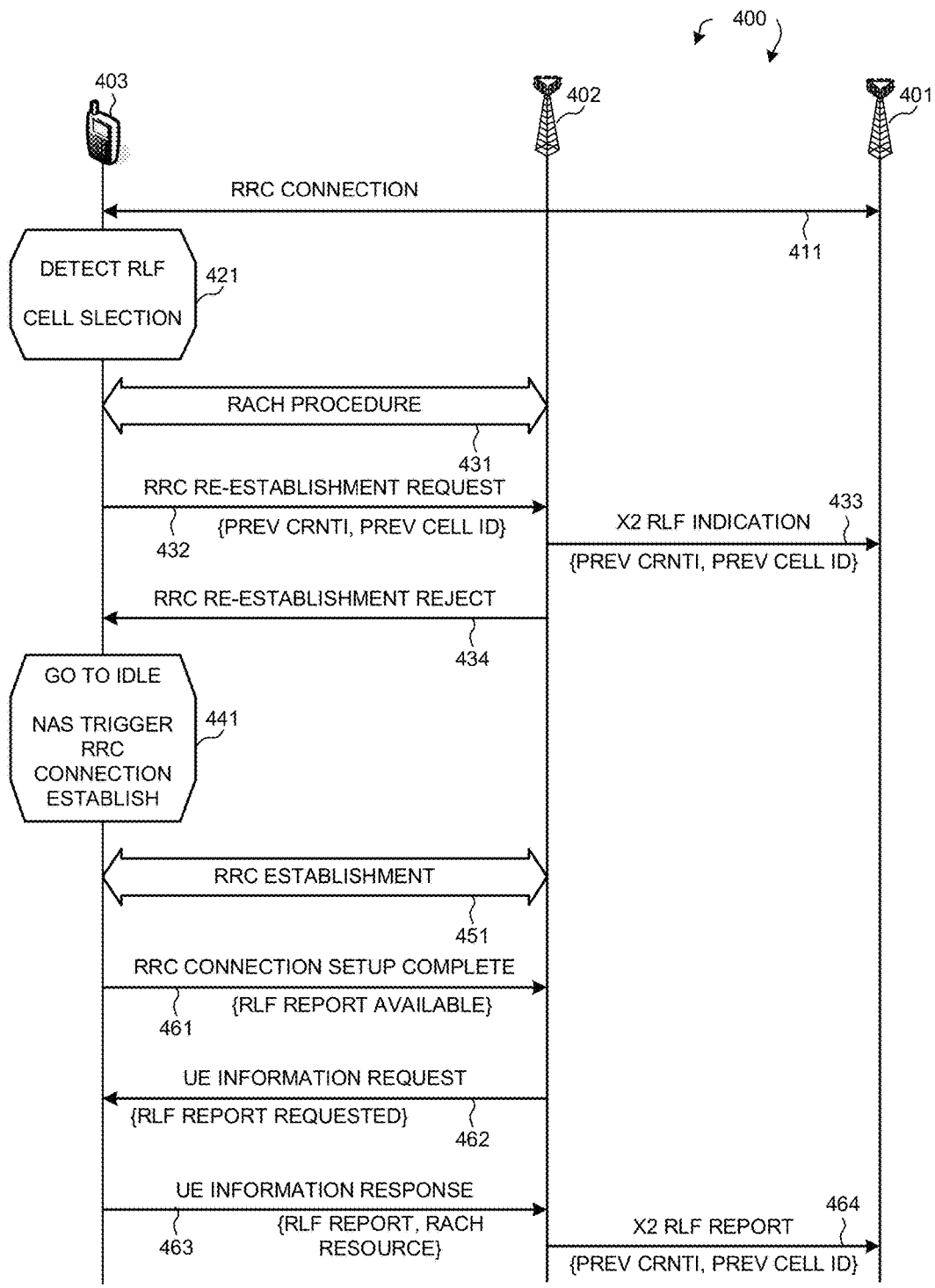
FIG. 4 illustrates a second embodiment of reporting failure event with correlation information.

FIG. 4 illustrates a second embodiment of reporting failure event with correlation information in a wireless communication network 400. Wireless communication network 400 comprises a first eNB 401, a second eNB 402, and a UE 403. FIG. 4 is similar to FIG. 3, where UE 403 was initially connected to eNB 401 (step 411), but is later connected to eNB 402 after detecting a failure event (step 421). In the example of FIG. 4, however, a specific example of correlation information is illustrated. In step 431, UE 403 performs a random access channel (RACH) procedure with eNB 402 over certain RACH resource such as a certain RACH preamble code over a RACH opportunity with a certain system frame number (SFN) for RACH transmission. After successful RACH attempt, UE 403 sends a RRC re-establishment request to eNB 402 in step 432. The RRC re-establishment request includes the UE identity of UE 403 with respect to its previous connection with eNB 401. In step 433, eNB 402 forwards an RLF indication to eNB 401 via X2 interface. The RLF indication also contains the UE identity information so that eNB 401 can identify the corresponding UE.

Because eNB 402 has not been prepared, the RRC re-establishment procedure fails. In step 434, eNB 402 sends an RRC re-establishment reject message to UE 403. Step 441 through step 462 of FIG. 4 is again similar to step 341 through step 362 of FIG. 3. In step 463, UE 403 sends an information response message back to eNB 402. The response message contains the RLF report, along with the correlation information {RACH resource} of the successful RACH attempt. Because the RACH resource is typically uniquely associated with UE 403, eNB 402 will be able to identify UE 403 with such correlation information. Once eNB 402 received the RLF report and the correlation information {RACH resource}, it can identify the previous UE identity of UE 403 based on the correlation information. In step 464, eNB 401 receives the RLF report, as well as the previous UE identity of UE 403 (e.g., previous C-RNTI, previous cell ID, and MAC-I). Based on the UE identity, eNB 401 is able to determine that the received RLF report is related to the earlier RLF indication received in step 432 for the same UE 403 to avoid double bookkeeping. In addition, eNB 401 is able to make better MRO decision based on the detailed measurements contained in the RLF report.

In one specific example, UE 403 receives correlation information from the first base station eNB 401 during the ongoing RRC connection. The correlation information can uniquely identify the UE or identify a class of UEs that uses the same or similar parameters. For example, UE 403 receives the correlation information that is contained in a new information element (IE) provided by eNB 401 in an RRC message. UE 403 sends the correlation information to eNB 402 later on together with the failure event report, which is forwarded to eNB 401 along with the failure event report.

In another specific example, the second base station and the first base station could be the same. For example, the UE is first connected to a first cell served by the first base station, and then performs RRC connection setup with a second cell or event the same cell served by the same base station.

Figure 5:
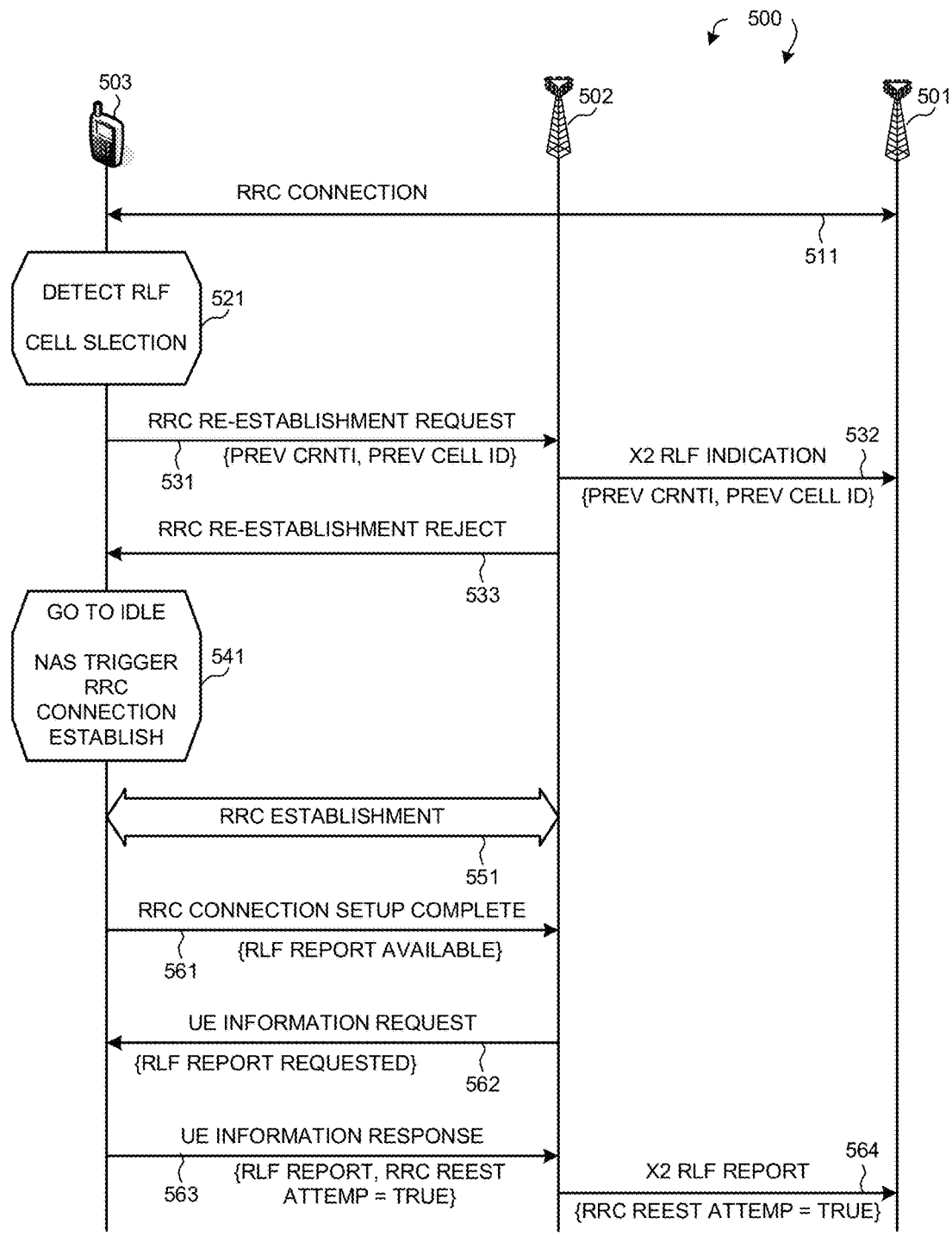
FIG. 5 illustrates a third embodiment of reporting failure event with correlation information.

FIG. 5 illustrates a third embodiment of reporting failure event with correlation information in a wireless communication network 500. Wireless communication network 500 comprises a first eNB 501, a second eNB 502, and a UE 503. FIG. 5 is similar to FIG. 3, where UE 503 was initially connected to eNB 501 (step 511), but is later connected to eNB 502 after detecting a failure event (step 521). In the example of FIG. 5, however, eNB 502 does not provide any correlation information to UE 503 when RRC re-establishment fails (step 533). The other difference is in step 563. In step 563, UE 503 sends an information response message back to eNB 502. The response message contains the RLF report. The response message, however, does not any UE identity information. Instead, the response message includes an indication of the existence of the previous RRC re-establishment attempt. For example, the response message may contain a Boolean variable of {RRC REEST ATTEMPT=TRUE}. In step 564, eNB 501 receives the RLF report as well as the Boolean variable forwarded by eNB 502. Although eNB 501 does not know the exact UE identity associated with the RLF report, based on the Boolean variable, eNB 501 is still likely to be able to "guess" that the RLF report is related to a previous failure event indicated in step 532.

This is a simple way for UE to indicate that there may be case of double bookkeeping. The UE simply remembers and indicates that it performed a RRC re-establishment attempt following upon the failure event for which there is failure event information to report. Furthermore, UE only makes such indication if there was assurance that the RRC re-establishment request message was received by the RAN (e.g., step 531). The assurance can be an RLC acknowledgement (ACK), a MAC/HARQ ACK, or an RRC response message received such as an RRC re-establishment reject message (e.g., step 532). This is because the RRC re-establishment may fail for other reasons such as a bad radio connection, and the request message never has been properly delivered to the RAN. In such cases, no X2 RLF indication message is generated, and there is no risk that an RLF report delivered later would cause double bookkeeping. Thus by taking into account transmission failures, failure event statistics is more precise to reduce the number of bad MRO decisions.

Figure 6:
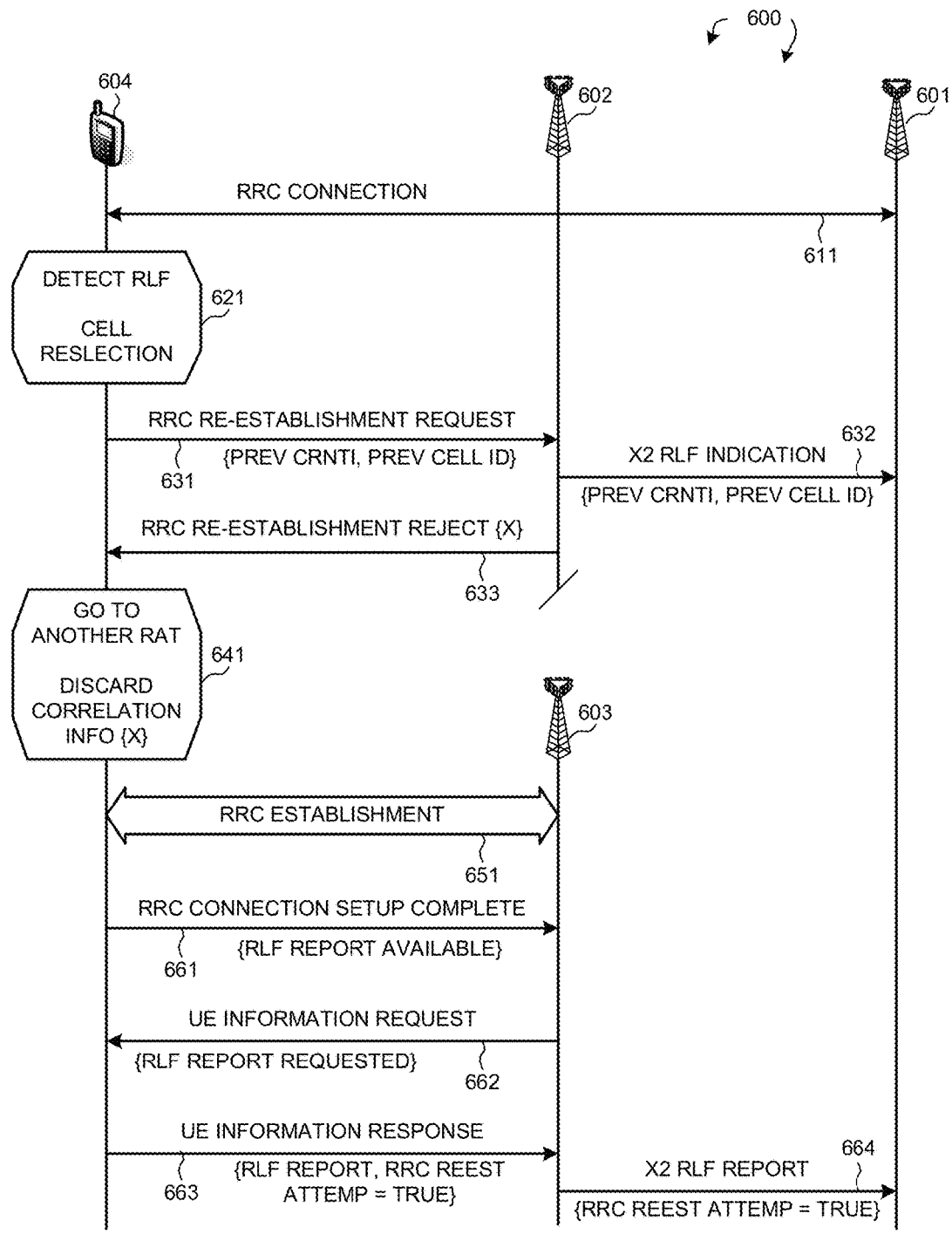
FIG. 6 illustrates a fourth embodiment of reporting failure event with correlation information.

FIG. 6 illustrates a fourth embodiment of reporting failure event with correlation information in a wireless communication network 600. Wireless communication network 500 comprises a first eNB 601, a second eNB 602, a third eNB 603, and a UE 604. FIG. 6 is similar to FIG. 3, where UE 604 was initially connected to eNB 601 (step 611), but later detects a failure event (step 621) and attempts an RRC re-establishment procedure with eNB 602 (step 631). UE 604 also receives correlation information {X} when RRC re-establishment fails (step 633). In the example of FIG. 6, however, UE 604 does not attempt RRC establishment with eNB 602 immediately. Instead, UE 604 goes to RRC_IDLE mode, and then stays there for a while or goes to another RAT. While the RLF report may be kept by the UE for a long time (e.g., for up to 48 hours), the correlation information for the purpose of identifying UE and determining UE context is only useful if it is fresh, e.g., based on a timer or based on the knowledge that UE has not dwelled on another RAT.

In the example of FIG. 6, UE 604 goes to another RAT. Therefore, UE 604 discards correlation information {X} because it is no longer fresh. Step 651 through step 662 of FIG. 6 is again similar to step 351 through step 362 of FIG. 3, with the only difference that UE 604 performs RRC establishment with a different eNB 603 in another RAT. In step 663, UE 604 sends an information response message back to eNB 603. The response message contains the RLF report, but no longer contains the already discarded correlation information {X}. Instead, similar to the third embodiment illustrated in FIG. 5, the response message contains an indication of the existence of the previous RRC re-establishment attempt. For example, the response message may contain a Boolean variable of {RRC REEST ATTEMPT=TRUE}. In step 664, eNB 601 receives the RLF report as well as the Boolean variable forwarded by eNB 603. Although eNB 601 does not know the exact UE identity associated with the RLF report, based on the Boolean variable, eNB 601 is likely to be able to "guess" that the RLF report is related to a previous failure event indicated in step 632.

The benefit of providing correlation information only if fresh is two-fold. First, overhead can be reduced because the UE avoid providing the correlation information when not needed, i.e., when RAN has lost the UE context and correlation is no longer useful. Second, possible miss-correlation can be avoided, e.g., a new UE could have been allocated the C-RNTI used by another UE previously, and its context should not be correlated with a certain failure event report. Alternatively, the correlation information is provided only in the RRC connection immediately following a failed RRC re-establishment, i.e., the RRC connection that is result of NAS-recovery triggered RRC establishment. Such principle is extremely simple to implement, e.g., no timer is needed, and UE does not need to remember anything about another RAT.

Figure 7:
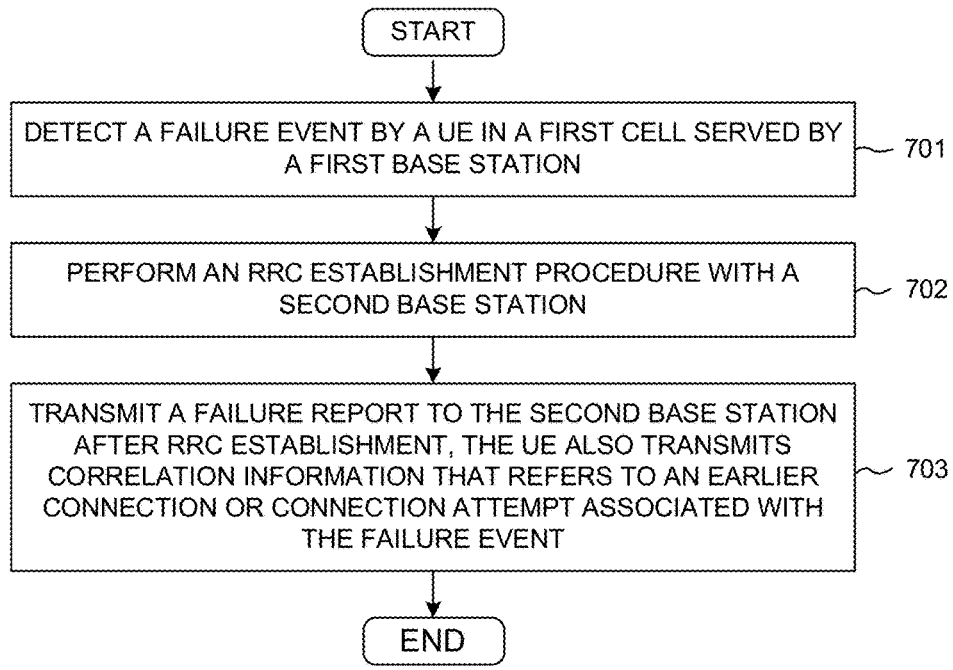
FIG. 7 is a flow chart of a method of detecting and reporting failure event by a user equipment in accordance with one novel aspect.

FIG. 7 is a flow chart of a method of detecting and reporting failure event by a user equipment in accordance with one novel aspect. In step 701, the UE detects a failure event in a first cell served by a first base station. The failure event may include a radio link failure, a handover failure, or a RACH failure. In step 702, the UE performs an RRC establishment procedure in a second cell, which may be served by a second base station. In step 703, the UE transmits a failure event report to the second base station after RRC establishment. The UE also transmits correlation information of the failure event along with the failure event report, and the correlation information enables the base station to identify the UE with regard to the failure event.

Figure 8:
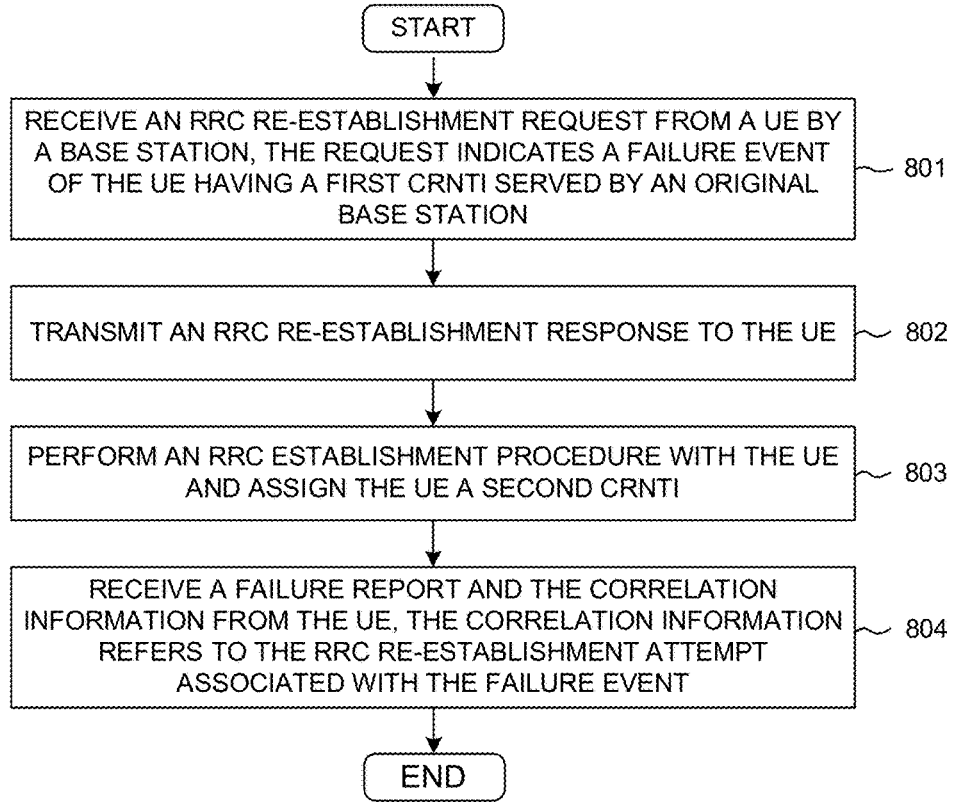
FIG. 8 is a flow chart of a method of handling failure event with correlation information by a base station in accordance with one novel aspect.

FIG. 8 is a flow chart of a method of handling failure event with correlation information by a base station in accordance with one novel aspect. In step 801, the base station receives an RRC re-establishment request from a UE. The request indicates a failure event of the UE having a first C-RNTI served by an original base station. In step 802, the base station transmits an RRC re-establishment response to the UE. In step 803, the base station performs RRC establishment procedure with the UE and assigns the UE a second C-RNTI. In step 804, the base station receives a failure event report as well as the correlation information from the UE. The correlation information refers to an earlier RRC re-establishment attempt associated with the failure event.

As illustrated above, correlation information for RLF report is provided by UE to the network only if it is fresh. For inter-RAT (IRAT) cases, it may not make sense at all to try to correlate UE context and RLF report. Inter-vendor signaling needs to be tested and it is likely that network will not support all cases of inter-RAT interaction. Thus for inter-RAT cases and possibly for inter-frequency cases, where there may also be a multi-vendor RAN situation, a more general approach may be to introduce all information that is needed for non-ambiguous conclusions into the RLF report itself than relying on network correlation. Therefore, the concept of providing correlation information can be easily extended and applied in inter-RAT or inter-frequency cases—That is, instead of providing correlation information, the UE provides full information about the relevant RNTI and the cell identification information together with the RLF report to the network. Additional details of such inter-RAT RLF report are now described below.

RLF report is used to optimize handover parameters and to detect coverage problems. In general, RLF report is used in LTE allowing UE to report information to the network about a connection failure event, such as a radio link failure or a handover failure. The reported information includes available geographical location information and available mobility measurement results. However, the current LTE RLF report only applies for intra-RAT cases. In many networks of today, inter-RAT mobility performance is very poor and is not easily detected because of limited OAM interaction between systems of different radio access technologies.

It is an object of the current invention to address the shortcomings of prior art by adding sufficient information to the RLF report to make it applicable and usable for inter-RAT cases. Based on RLF report, corrective actions and adjustments can be adopted by the network to mitigate the failures. By providing more reliable information in the RLF report than a network solution could provide, inter-RAT mobility performance can be improved.

In one embodiment, information configured in the UE regulating and limiting measurement opportunities for IRAT is included in the RLF report. The UE configuration information being in effect when the failure event occurs. This way it would be possible to deduce the expected UE mobility performance and thus know how to classify the failure event, in order to determine the severity of the problems. More specifically, it is proposed that information about measurement gap configuration, indication of which RATs or number of RATs the UE measures on, and indication of which carrier frequencies or number of carrier frequencies the UE measures on, is included in the RLF report.

One important scenario of inter-RAT mobility failure is when UE is commanded by the network to change RAT and the UE fails to connect to the target RAT. This is referred to as inter-RAT or IRAT handover failure (HOF), although the intention is that also other kinds of network ordered mobility would be included, e.g., redirection, cell change, with or without network assistance (where the network may add information that helps the UE to connect quicker to the target cell). Due to system interoperability complexity, IRAT mobility is often supported using only simple mechanisms. For example, the current LTE RLF report does not support reporting information related to IRAT handover failure.

In one novel aspect, UE that is connected to a radio access node (e.g., a serving base station) being configured by the network to move its connection from one radio access technology to another radio access technology, or to an access using another Duplexing mode than the serving cell, and the move of connection fails, the UE stores logged information that is related to the failure, and the logged information can later be retrieved by the network. Here, it is assumed that a common trigger for detection of such failure is a timer timeout, and the timer is started when the UE receives the network command to move the connection from one RAT to another RAT. It is also assumed that the UE may need to do network checking towards multiple PLMN IDs in order to determine if it is allowed to report the recorded failure event.

Figure 9:
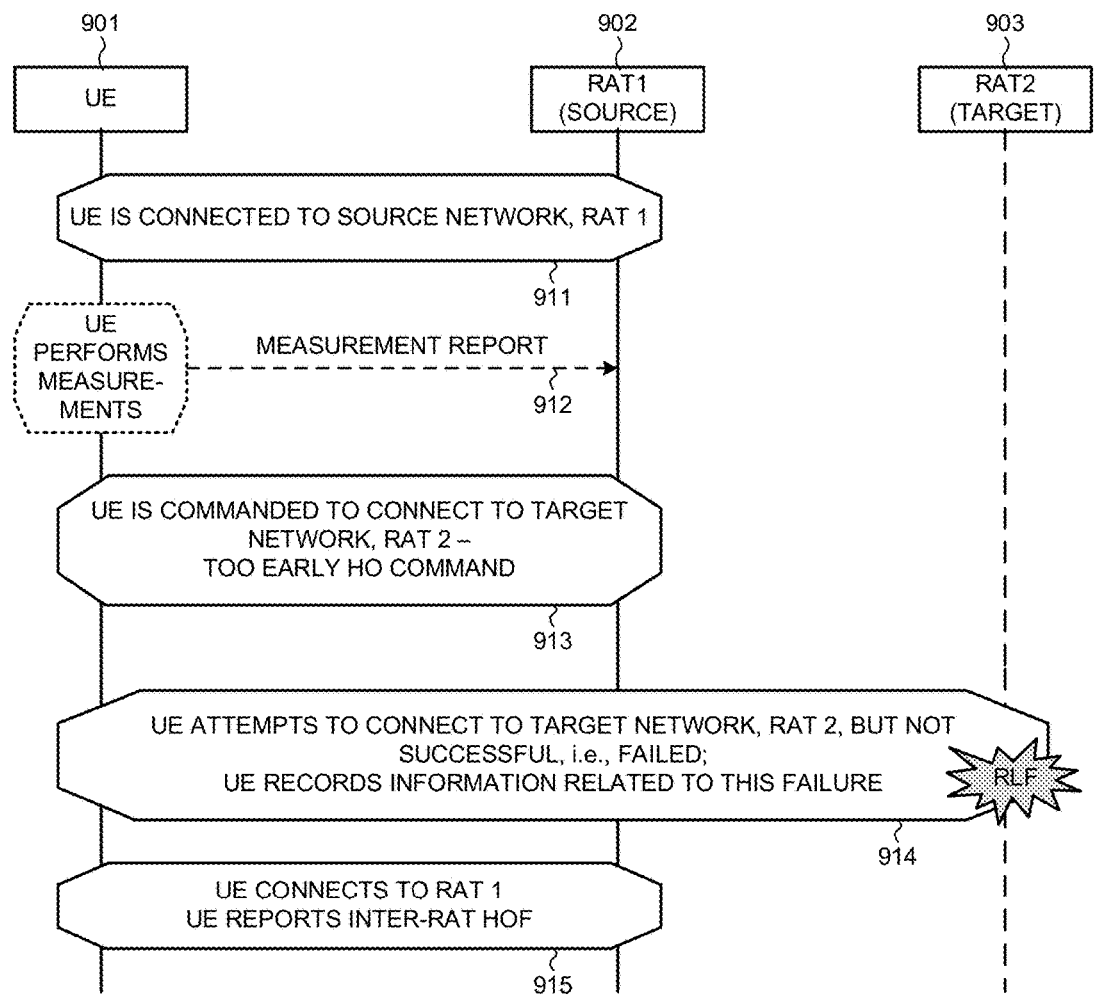
FIG. 9 illustrates one embodiment of reporting inter-RAT HOF due to too early handover command in a wireless communication network.

FIG. 9 illustrates one embodiment of reporting inter-RAT HOF to the network due to too early handover command in a wireless communication network 900. Wireless communication network 900 comprises a UE 901, a first RAT1 902 (e.g., the source network), and a second RAT2 903 (e.g., the target network). In step 911, UE 901 is connected to the source network RAT1. In step 912, UE 901 records and reports mobility measurement results to RAT1. In step 913, UE 901 receives a handover command from the source network RAT1 to connect to the target network RAT2. However, this HO command is sent too early. In step 914, UE 901 attempts to connect to the target network RAT2. However, the handover attempt fails due to too early HO command. UE 901 then records information related to the failure. In step 915, UE 901 connects back to the source network RAT1. UE 901 then reports the recorded IRAT HOF information to the source network RAT1.

As illustrated in FIG. 9, when a UE cannot connect to a target cell or a target RAT, the expected behavior is that the UE will try to go back to the source cell where the UE receives the handover command (e.g., UE 901 connects back to the source network RAT1). It is assumed that corrective action to improve IRAT mobility performance is most likely to be taken in the source cell, considering that configuration parameters for determining when to or if to perform IRAT handover would reside there. Furthermore, it is assumed that networks of different RATs have different OAM systems that may not be well connected. It seems a good idea to allow Radio access networks and Core networks of different RATs to have as little interaction as possible to reduce interoperability problems. Therefore, the IRAT HOF information is reported to the source network, the source RAT, or the source cell.

For IRAT mobility, the mobility measurements in step 912 have a particular meaning in detecting "blind" handovers (i.e., mobility that is commanded by the network without UE providing a measurement report with measurement results of the target cell as a trigger for the handover). The corrective action for failed blind handovers could be that UEs will be configured to do measurements before handover. The usage of blind handovers is particularly widespread in IRAT scenarios where handover decision is based on service requirements. However, sometimes UE would be configured to do measurements, e.g., event-based measurements to trigger handover, but the UE would still be handover to other RAT blindly based on service trigger for handover. In such cases, while the handover is still regarded as blind, it may not be possible to deduce the blind handover by looking at the measurements report in the RLF report. Thus, it is proposed that the UE shall be able to report whether a handover is blind, i.e., if there was a measurement report for the target cell reported to the network before the mobility command. In one example, the recorded IRAF HOF information comprises explicit indication of whether a handover is blind.

Figure 10:
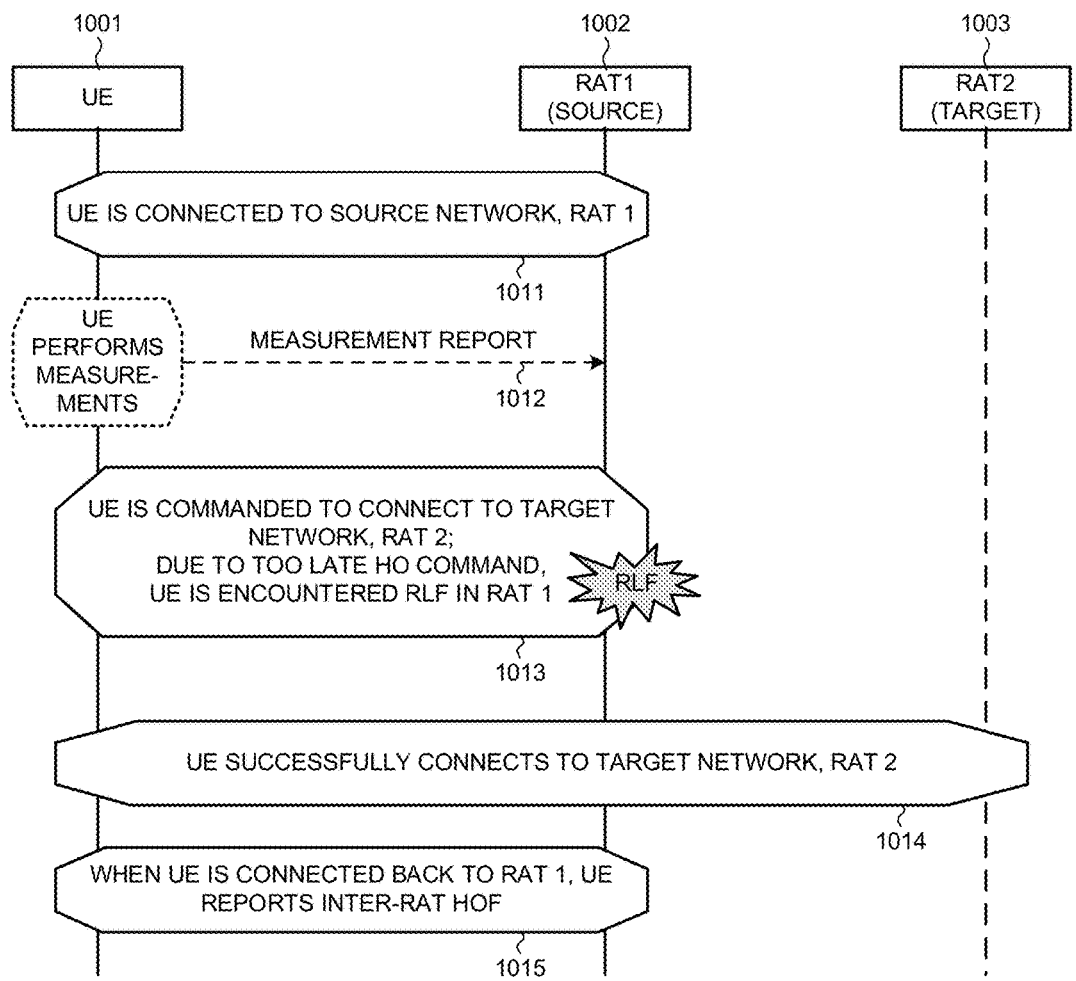
FIG. 10 illustrates one embodiment of reporting inter-RAT HOF due to too late handover command in a wireless communication network.

FIG. 10 illustrates one embodiment of reporting inter-RAT HOF to the network due to too late handover command in a wireless communication network 1000. Wireless communication network 1000 comprises a UE 1001, a first RAT1 1002 (e.g., the source network), and a second RAT2 1003 (e.g., the target network). In step 1011, UE 1001 is connected to the source network RAT1. In step 1012, UE 1001 records and reports mobility measurement results to RAT1. In step 1013, UE 1001 receives a handover command from the source network RAT1 to connect to the target network RAT2. However, this HO command is sent too late. Before receiving the HO command, UE 1001 encounters a radio link failure in RAT1. UE 1001 then records information related to the failure. In step 1014, UE 1001 attempts to connect to the target network RAT2 and is successfully connected to RAT2. In step 1015, UE 1001 connects back to the source network RAT1 and reports IRAT HOF information to the source network RAT1.

IRAT mobility is often done for service reasons and some types of mobility may be more likely to fail than other types, e.g., due to latency to connect to the target cell. Thus, the corrective action to fix problems may be to determine a better performing type of mobility. Thus, it is proposed that the IRAT HOF information to be recorded and reported in step 1015 includes the type of and reason for the purpose of mobility: handover, redirection, NACC (Network Assisted Cell Change), CSFB (Circuit-switched Fallback), Enhanced CSFB, and SRVCC (Single Radio Voice Call Continuity), etc.

Furthermore, the corrective action may sometimes be done by the target cell. In order to know if corrective action by the target cell may be possible (e.g., provide more RACH resource to address high access load blocking), more information about the failure reason needs to be known. It is proposed that the IRAT HOF information to be recorded and reported in step 1015 includes the type of failure: target cell not found, target cell not suitable or not allowed, and access attempted by the UE but failed in the target cell.

In addition to IRAT handover failure, a very likely connection failure scenario is UE encounters a connection failure when the UE connects to one cell (e.g., radio link failure), and the UE then connects to another RAT after the failure. This is referred to as inter-RAT RLF or IRAT RLF. For such failure, the current LTE RLF report may sometimes provide information, for example, the UE includes available mobility measurement results. If available mobility measurement results at RLF indicates that there is no intra-frequency neighbor but an IRAT neighbor is suitable, then it could be assumed that handover to the IRAT neighbor may have prevented the failure.

However, a problem is that UE may not report in the RLF report measurements for an IRAT neighbor. One reason could be that the UE does not have a configuration for IRAT mobility measurements (not provided, e.g., for battery saving reasons). Another reason could be that the Stop-measure threshold in the serving cell is set too aggressively, allowing the UE to not do IRAT measurements in the source cell. In one novel aspect, for UE being connected to a radio access node (e.g., a serving base station) detects a radio link failure, UE subsequently doing a connection establishment to another radio access technology or to an access using another Duplexing mode than the previous serving cell, the UE stores logged information that is related to the RLF and the another RAT or the access. The logged information can later be retrieved by the network.

Figure 11:
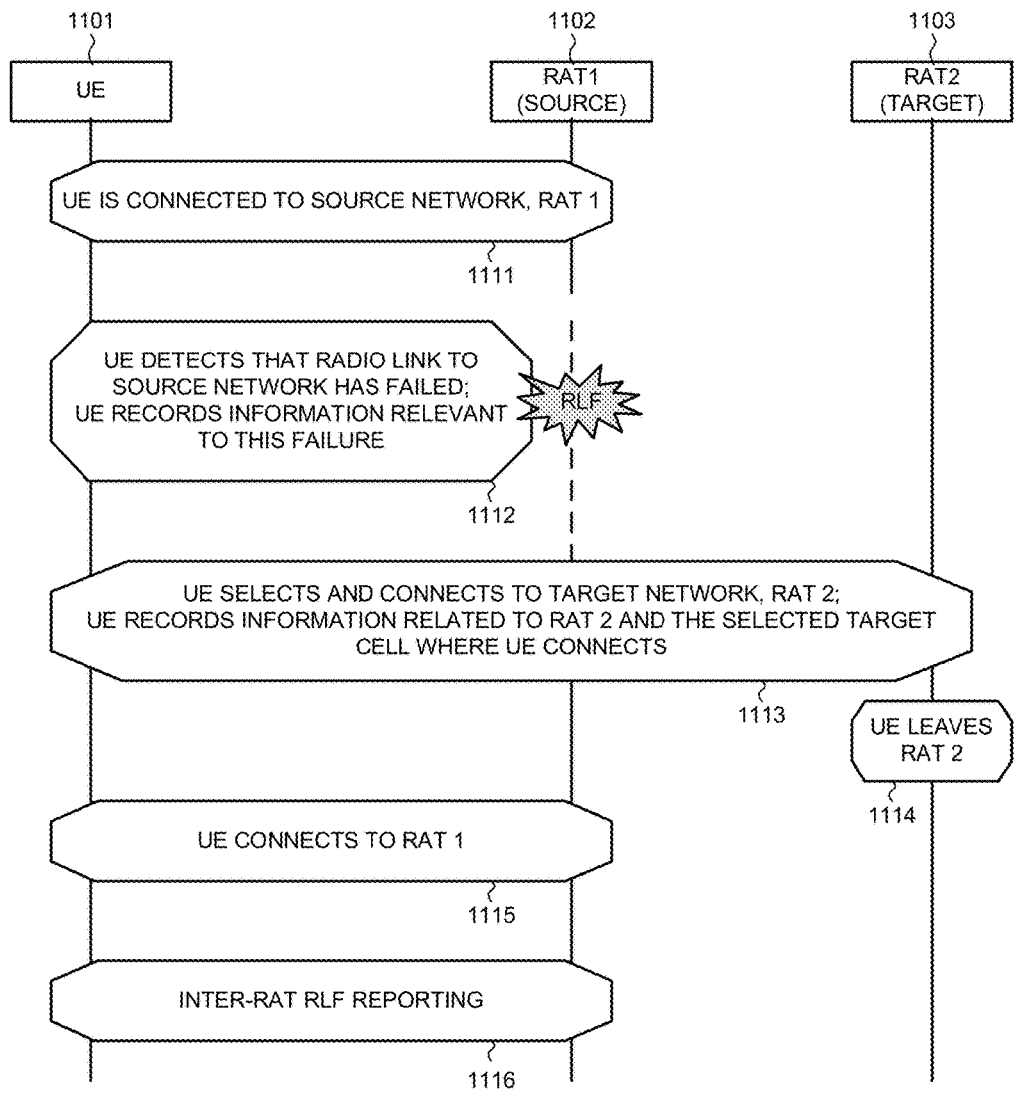
FIG. 11 illustrates one embodiment of reporting inter-RAT RLF to a source network in a wireless communication network.

FIG. 11 illustrates one embodiment of reporting inter-RAT RLF to the source network in a wireless communication network 1100. Wireless communication network 1100 comprises a UE 1101, a first RAT1 1102 (e.g., the source network), and a second RAT2 1103 (e.g., the target network). In step 1111, UE 1101 is connected to the source network RAT1. In step 1112, UE 1101 detects that the radio link to the source network fails. UE 1101 thus records information relevant to this failure. In step 1113, UE selects a target cell and connects to the target network RAT2 by performing an RRC establishment procedure. UE 1101 records information related to RAT2 and the selected target cell where the UE connects. For example, the recorded information includes the selected target cell ID that comprises the PCI (PSC+frequency) of RAT2. In step 1114, UE 1101 leaves RAT2, e.g., due to radio coverage or due to service no longer needed. In step 1115, UE 1101 returns to RAT1 and goes to connected mode, e.g., due to radio coverage or due to service needed. In step 1116, UE 1101 reports IRAT RLF to the source network RAT1. The IRAT RLF report includes the recorded information about the radio link failure event, and about the UE 1101 connecting to the target RAT2 and/or the selected target cell after the failure. This information is needed to identify a potential neighboring cell of a different RAT that may be unknown to the original serving eNB.

As illustrated in FIG. 11, to support that networks of different RATs are not well connected, in OAM domain and in PLMN, and to support that corrective actions are taken in the cell where the failure occurred, UE 1101 is able to report the recorded IRAT RLF information to the source network/RAT/cell, i.e., where the failure happened. More specifically, UE 1101 records the identity, the carrier frequency, and the RAT of the selected cell where UE 1101 does the connection establishment, alternatively a global cell identity from which the carrier frequency and RAT could be deduced. Knowing the RAT, the carrier frequency, and the identity of the target cell, the network could ensure that there is an inter-RAT measurement configuration to enable IRAT mobility. Knowing the identity of the (re)connection cell would make it possible for the network to address RLF by triggering handover to the identified cell earlier.

It is also assumed that the UE could record the time from the radio link failure trigger until connection attempt for which the connection setup is successful (e.g., when UE has selected the target cell to connect). In cases when UE cannot do measurements before the failure happens (e.g., when UE has not IRAT measurement configuration), then it could be assumed that the (re)connection cell is a good handover candidate if the time from failure to connection is short.

Figure 12:
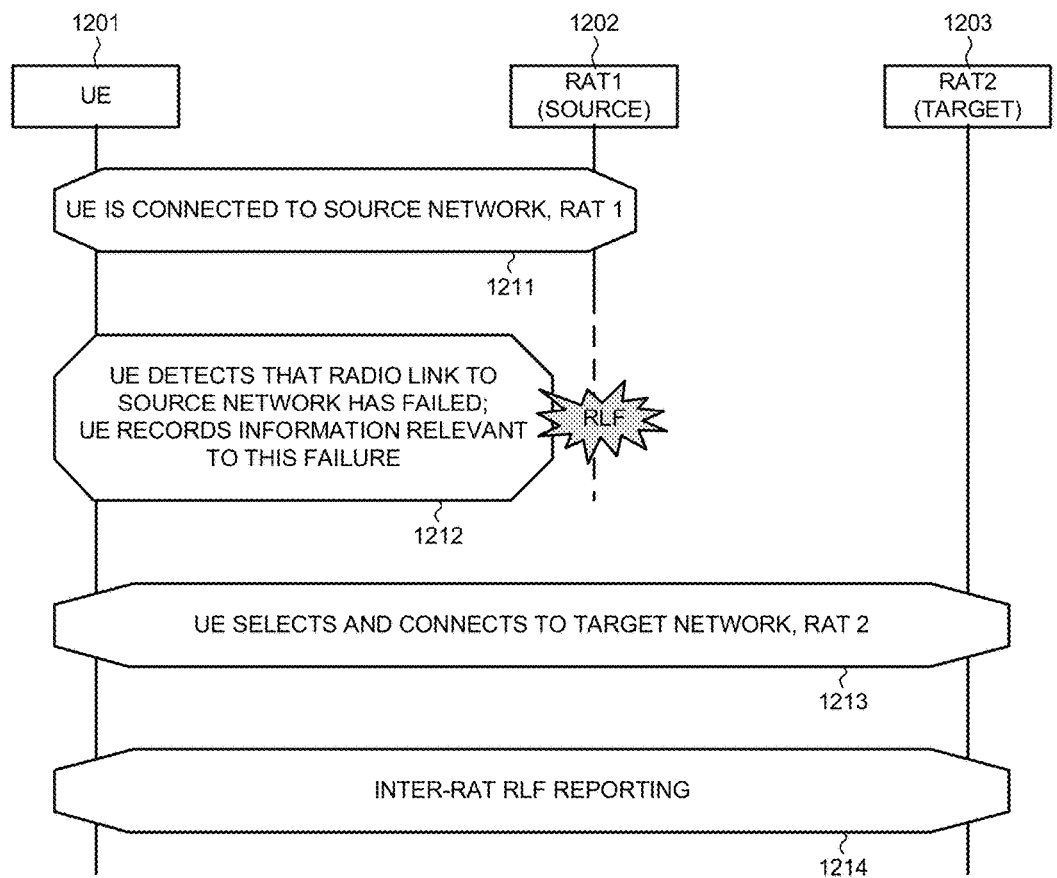
FIG. 12 illustrates one embodiment of reporting inter-RAT RLF to a target network in a wireless communication network.

FIG. 12 illustrates one embodiment of reporting inter-RAT RLF to the target network in a wireless communication network 1200. Wireless communication network 1200 comprises a UE 1201, a first RAT1 1202 (e.g., the source network), and a second RAT2 1203 (e.g., the target network). In step 1211, UE 1201 is connected to the source network RAT1. In step 1212, UE 1201 detects that the radio link to the source network fails. UE 1201 thus records information relevant to this failure. In step 1213, UE 1201 selects a target cell and connects to the target network RAT2 by performing an RRC establishment procedure. In step 1214, UE 1201 reports IRAT RLF to the target network RAT2. The IRAT RLF report includes recorded information about the radio link failure event. To support a more sophisticated networks of different RATs that are well connected, which may be likely in the future, UE 1201 reports the recorded information to the target network/RAT/cell, i.e., where the UE connects after a failure has happened.

Regardless of where the UE makes the IRAT RLF report to the source RAT or to the target RAT, it is assumed that the cell where the failure happened need to be the primary place for corrective actions. It is proposed that the UE records the identity, the carrier frequency and the RAT of the cell where the radio link failure was triggered, or a global identity from which the RAT and frequency could be deduced. The recorded information is included in the RLF report and then transmitted to the source/target RAT. Such information would make it much easier to identify the cell where corrective action may be done.

Regardless of where the UE makes report to the source RAT or to the target RAT, in order to support correlation of failure with the exact UE configuration used in the source cell where the failure happened, to support more sophisticated corrective actions, it is proposed that UE also records the following information: RNTI value that was used for the UE in the source cell (e.g., was unique at least in the source cell or in the source RAN), and time information that makes it possible to deduce when the provided RNTI value was used by the UE (e.g., the elapsed time from the occurrence of the failure to the reporting of the failure).

In the example of FIG. 11 and FIG. 12, the radio link failure occurs in the source network and is likely to be caused by too late handover. Likewise, radio link failure can occur in the target network and is likely to be cause by too early handover.

Figure 13:
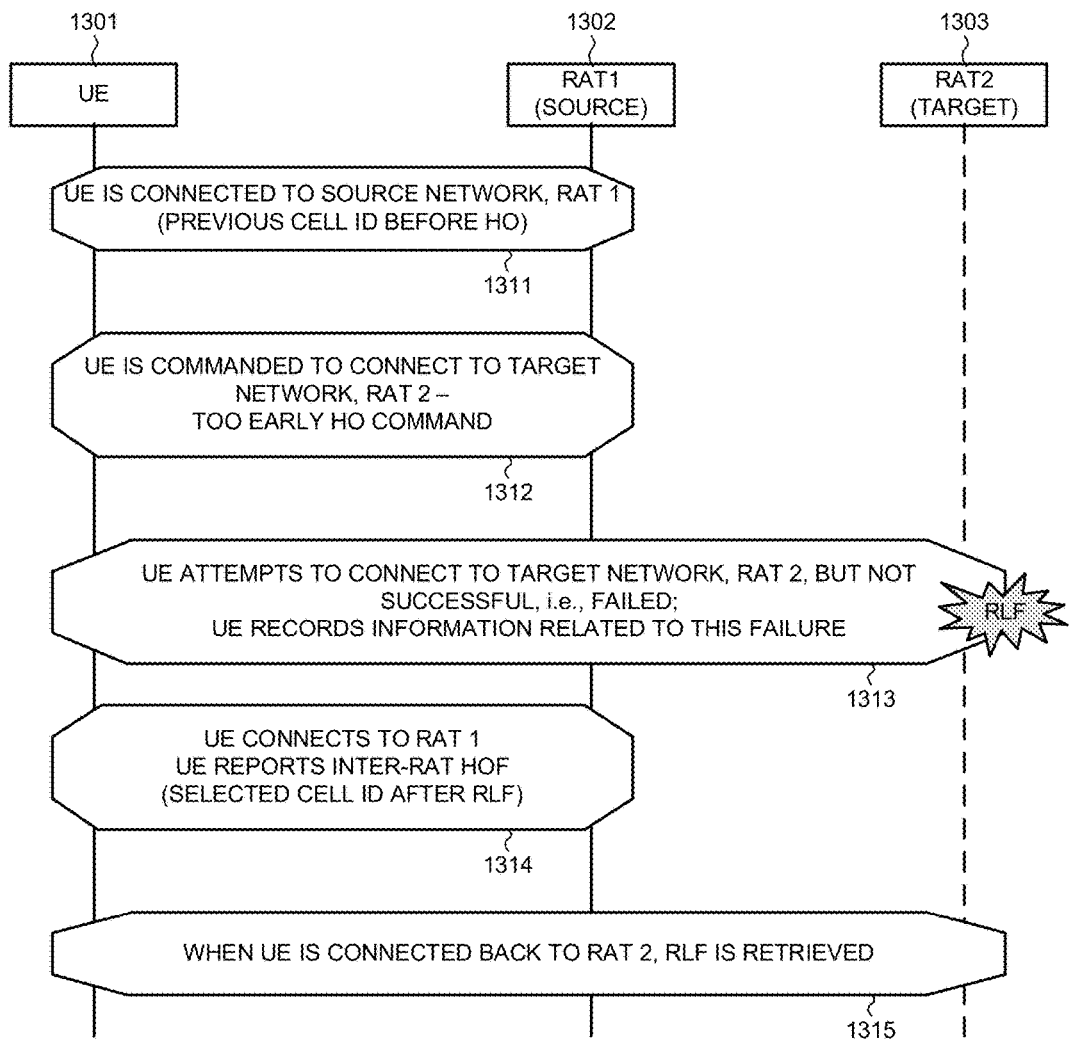
FIG. 13 illustrates one embodiment of reporting inter-RAT HOF/RLF to the network where the failure event is triggered in a wireless communication network.

FIG. 13 illustrates one embodiment of reporting inter-RAT HOF/RLF to the network where the failure event is triggered in a wireless communication network 1300. Wireless communication network 1300 comprises a UE 1301, a first RAT1 1302 (e.g., the source network), and a second RAT2 1303 (e.g., the target network). In step 1311, UE 1301 is connected to a source cell in the source network RAT1. In step 1312, UE 1301 receives a handover command from the source network RAT1 to connect to the target network RAT2. However, this HO command is sent too early. In step 1313, UE 1301 attempts to connect to the target network RAT2. However, the handover attempt fails due to too early HO command. Alternatively, UE 1301 may successfully connect to RAT2 initially, but shortly after, it encounters radio link failure. UE 1301 then records information related to the HOF/RLF. In step 1314, UE 1301 selects a target cell in RAT1 and connects to RAT1. Because HOF is triggered in RAT1, UE 1301 may report the IRAT HOF to RAT1.

In the example of FIG. 13, in step 1315, when UE 1301 is connected back to RAT2 where the RLF is triggered, UE 1301 reports IRAT RLF to RAT2. The IRAT RLF report may include both the selected cell ID and the previous cell ID. The selected ID includes the PCI of the target cell in RAT1 where UE 1301 attempts to connect after the RLF in RAT2 (e.g., in step 1314). This is needed in order to distinguish this scenario from the scenario where UE 1301 connects to another cell after the failure. The previous cell ID includes the PCI of the source cell in RAT1 where UE 1301 was previously served before the handover (e.g., in step 1311). This is needed to enable sending a notification from RAT2 to RAT1.

Figure 14:
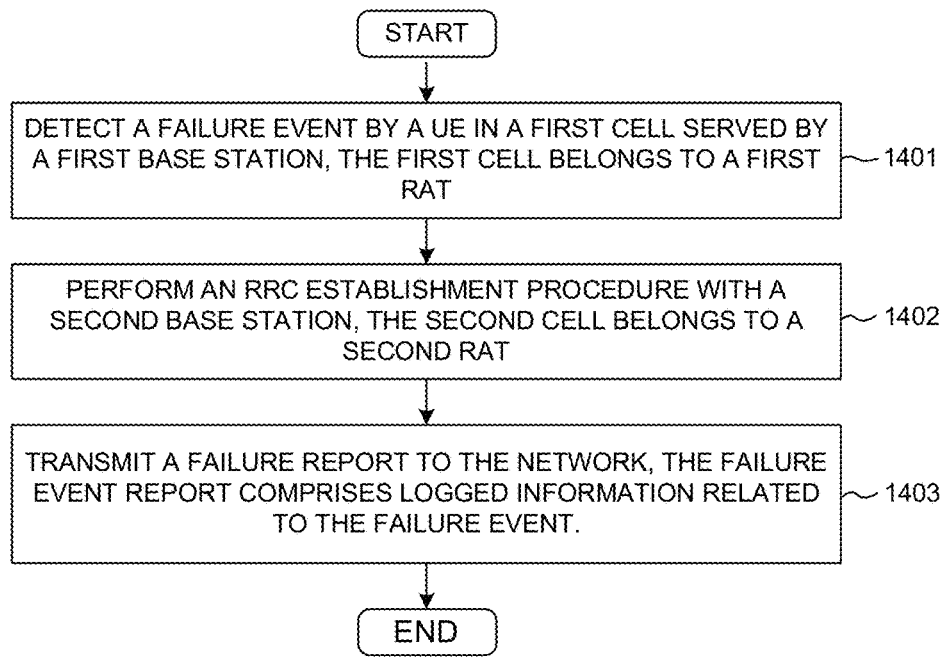
FIG. 14 is a flow chart of sending IRAT RLF in a wireless communication network in accordance with one novel aspect.

FIG. 14 is a flow chart of sending IRAT RLF in a wireless communication network in accordance with one novel aspect. In step 1401, a UE detects a failure event in a first cell served by a first base station, and the first cell belongs to a first RAT. In step 1402, the UE performs an RRC establishment procedure with a selected second cell served by a second base station, and the second cell belongs to a second RAT. In step 1403, the UE transmits a failure event report to the wireless communication network. The failure event report comprises logged information related to the failure event. In one embodiment, the failure event report comprises an identity, a carrier frequency and a radio access technology of the cell where RRC establishment is performed, and the information is reported to the first RAT. In another embodiment, the failure event report comprises an identity, a carrier frequency and a radio access technology of the cell wherein the failure event was triggered, and the information is reported to the second RAT.

Figure 15:
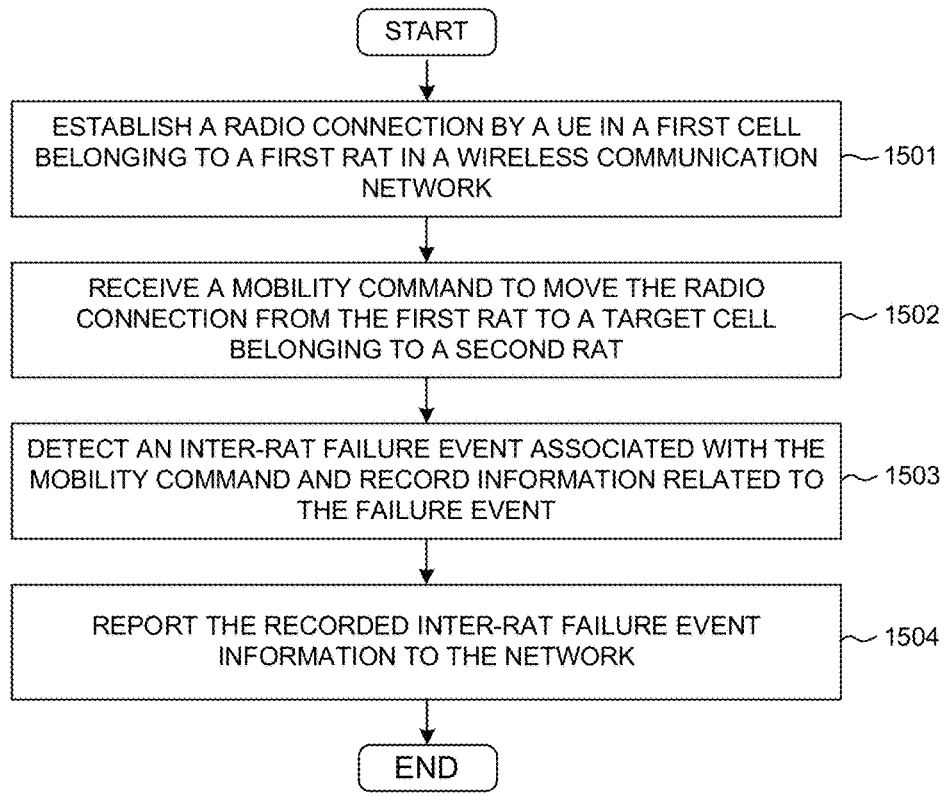
FIG. 15 is a flow chart of sending IRAT HOF in a wireless communication network in accordance with one novel aspect.

FIG. 15 is a flow chart of sending IRAT HOF in a wireless communication network in accordance with one novel aspect. In step 1501, a UE establishes a radio connection in a first cell belonging to a first RAT. In step 1502, the UE receives a mobility command to move the radio connection from the first RAT to a target cell belonging to a second RAT. The mobility command is one of a handover command, a redirection, an NACC, a CSFB, and enhanced CSFB, or an SRVCC. In step 1503, the UE detects a failure event associated with the mobility command and records information related to the failure event. In step 1504, the UE reports the recorded inter-RAT failure event information to the network (e.g., where the failure event occurred or triggered). In one embodiment, the mobility command is a handover command, and the recorded information comprises whether the handover command is blind. In another embodiment, the recorded information comprises a type of failure to be one of the target cell not found, the target not suitable/not allowed, or access failed in the target cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   detecting a failure event by a user equipment (UE) in a first cell served by a first base station in a wireless communication network, wherein the first cell belongs to a first radio access technology (RAT);
   performing a radio resource control (RRC) establishment procedure with a selected second cell served by a second base station, wherein the second cell belongs to a second RAT;
   receiving a mobility command by the UE to move a radio connection from the first RAT to the second RAT, wherein the failure event is associated with the mobility command, and wherein the mobility command is a handover command; and
   transmitting a failure event report to the wireless communication network, wherein the failure event report comprises logged information related to the failure event, and wherein the logged information also comprises whether the handover command is blind indicating whether the handover is commanded by the network without the UE providing a measurement report of the second cell as a trigger for handover.

2. The method of claim 1, wherein the UE also records the time from the failure event until successful RRC establishment with the selected second cell.

3. The method of claim 1, wherein the failure event report comprises an identity, a carrier frequency and a radio access technology of the cell where RRC establishment is performed.

4. The method of claim 3, wherein the UE transmits the failure event report to the first RAT where the failure event occurs.

5. The method of claim 1, wherein the failure event report comprises an identity, a carrier frequency and a radio access technology of the cell wherein the failure event was triggered.

6. The method of claim 5, wherein the UE transmits the failure event report to the second RAT.

7. The method of claim 1, wherein the UE reports the logged information to the first RAT where UE receives the mobility command.

8. The method of claim 1, wherein the logged information comprises the type of the mobility command to be one of a handover command, a redirection, an NACC (Network Assisted Cell Change), a CSFB (Circuit-switched Fallback), an Enhanced CSFB, and an SRVCC (Single Radio Voice Call Continuity).

9. The method of claim 1, wherein the logged information comprises a type of failure to be one of the target cell not found, the target not suitable, the target cell not allowed, or access failed in the target cell.

10. A user equipment (UE), comprising:
- a failure event management module that detects a failure event in a first cell served by a first base station, wherein the first cell belongs to a first radio access technology (RAT);
- a connection management module that performs a radio resource control (RRC) establishment procedure with a second cell served by a second base station, wherein the second cell belongs to a second RAT;
- a receiver that receives a mobility command to move a radio connection from the first RAT to the second RAT, wherein the failure event is associated with the mobility command, and wherein the mobility command is a handover command; and
- a transmitter that transmits a failure event report to the wireless communication network, wherein the failure event report comprises logged information related to the failure event, and wherein the logged information also comprises whether the handover command is blind indicating whether the handover is commanded by the network without the UE providing a measurement report of the second cell as a trigger for handover.

11. The UE of claim 10, wherein the UE also records the time from the failure event until successful RRC establishment with the selected second cell.

12. The UE of claim 10, wherein the failure event report comprises an identity, a carrier frequency and a radio access technology of the cell where RRC establishment is performed.

13. The UE of claim 12, wherein the UE transmits the failure event report to the first RAT where the failure event occurs.

14. The UE of claim 10, wherein the failure event report comprises an identity, a carrier frequency and a radio access technology of the cell wherein the failure event was triggered.

15. The UE of claim 14, wherein the UE transmits the failure event report to the second RAT.

16. The UE of claim 10, wherein the UE reports the logged information to the first RAT where UE receives the mobility command.

17. The UE of claim 10, wherein the logged information comprises the type of the mobility command to be one of a handover command, a redirection, an NACC (Network Assisted Cell Change), a CSFB (Circuit-switched Fallback), an Enhanced CSFB, and an SRVCC (Single Radio Voice Call Continuity).

18. The UE of claim 10, wherein the logged information comprises a type of failure to be one of the target cell not found, the target not suitable, the target cell not allowed, or access failed in the target cell.

* * * * *